Patented Nov. 20, 1934

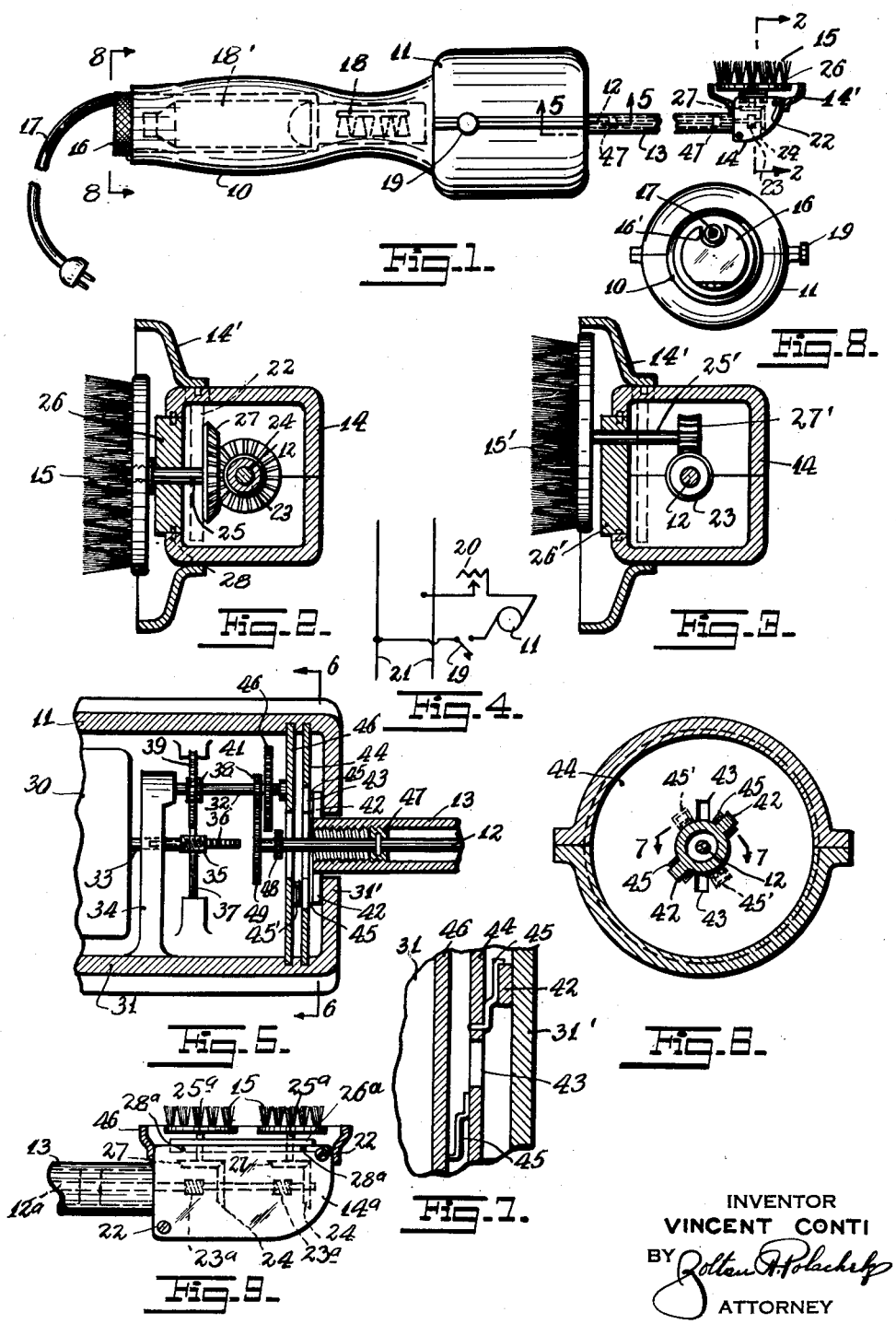

1,981,688

UNITED STATES PATENT OFFICE 1,981,688

ELECTRIC BRUSH FOR TEETH AND THE LIKE

Vincent Conti, New York, N. Y.

Application February 19, 1934, Serial No. 711,867

5 Claims. (Cl. 15—28)

This invention relates to new and useful improvements in an electric brush for teeth and the like.

The invention has for an object the construction of an electric brush which is characterized by a handle attached on the small motor having a drive shaft extending through a tubular member attached on the motor and connected with a casing supporting a rotative brush, and an arrangement for driving the brush with said motor.

Still further the invention proposes the provision of a mechanism whereby the speed of rotation of the brush may be controlled.

As another object of this invention an arrangement is proposed whereby the brush is removable to be substituted by different types of brushes. This arrangement allows substitution of brushes for the cleaning of finger nails and other parts in addition to the teeth.

Another one of the objects of this invention is the provision of a hollow within the handle, and a cover for an open end of said handle so that small parts, such as the brushes may be stored within the handle.

As another object of this invention an arrangement is proposed whereby the position of the tubular member previously mentioned controls a speed adjustment of the device.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view of a device constructed according to this invention.

Fig. 2 is a sectional view taken on the line 2—2 of Fig. 1.

Fig. 3 is a view similar to Fig. 2 but illustrating another type of brush in the device.

Fig. 4 is a schematic wiring diagram of the device.

Fig. 5 is a sectional view taken on the line 5—5 of Fig. 1.

Fig. 6 is a sectional view taken on the line 6—6 of Fig. 5.

Fig. 7 is a sectional view taken on the line 7—7 of Fig. 6.

Fig. 8 is an elevational view looking in the direction of the line 8—8 of Fig. 1.

Fig. 9 is a fragmentary enlarged view similar to a portion of Fig. 1 but illustrating a modification of the invention.

The electric brush according to this invention comprises a handle 10 attached on a motor 11 having a drive shaft 12 extending through a tubular member 13 attached upon said motor, a casing 14 on the end of the tubular member 13, a rotative brush 15 supported on the casing, and a drive mechanism connecting the shaft 12 with the brush 15. The handle 10 is of hollow construction and has its rear end open and normally closed with a hinged stopper 16 pressed into place. This stopper is provided with an edge opening 16' through which the cable 17 passes for the motor 11. The compartment within the handle may be used to store small brushes 18 and other articles 18' such as tubes of paste and the like. The motor 11 is controlled by a push button switch 19 mounted at a convenient place to be operated by a finger while the hand engages the handle for guiding the device.

In Fig. 4 a schematic wiring diagram of the device has been disclosed whereby the motor 11 is shown connected in series with the switch 19 and in series with a rheostat 20. This rheostat is not shown in Fig. 1 but should be included in the circuit for the purpose of controlling the speed of the motor. The circuit of the motor is shown connected in parallel with the power leads 21.

The casing 14 is composed of a pair of casing half sections removably connected with each other by screws 22. These casing sections divide upon a plane extending through the axis of the shaft 12 so that they may be separated and removed. The driving mechanism for the brush 15 is arranged within the casing 14 and comprises a worm pinion 23 fixed upon the shaft 12, and a bevel gear 24 also fixed upon the shaft 12. The brush 15 is provided with an axle 25 extending through a bearing 26 adapted to be mounted upon the casing 14. The inner end of the shaft 15 is provided with a bevel gear 27 meshing with the bevel gear 24. The bearing 26 is held in position by several pins 28 from the casing sections engaging the edges of the bearing. The brush 15 is threadedly engaged upon the spindle 25 in such a manner that the natural rotation of the spindle 25 tends to more firmly engage the brush upon the spindle. This arrangement allows the brush 15 to be removed from the spindle when desired to be exchanged for other similar brushes.

The arrangement of the casing is such that the brush 15 may be moved and substituted by any type of brush or by a brush adapted to rotate at a different speed to be used for example to clean the finger nails, which necessitates a higher speed than for the cleaning of the teeth. This arrangement is illustrated in Fig. 3 and comprises a brush 15' upon a spindle 25' extending through the bearing 26' and having a worm wheel 27' upon its inner end. This worm wheel 27' meshes with the worm pinion 23. Obviously the brushes 15 and 15' will rotate at different speeds because of the different speed ratios of the bevel gearing 24 and 27 and the worm gearing 23 and 27'. A removable guard 14' is mounted on the casing 14 and surrounds the back of the brush 15. This guard maintains its position frictionally upon the casing. It may be removed so that the casing sections may be separated for the purpose hereinafter described.

The motor 11 comprises a rotor 30 within a motor casing 31. A speed reduction mechanism is arranged within the casing 31 and connects with the rotor 30 and terminates in a shaft 32 parallel with the axis of the rotor 30 but spaced from the axis. Any type of speed reduction unit may connect the rotor 30 with the shaft 32. The spindle 33 is shown supporting the rotor 30 and is rotative in a standard 34. A worm pinion 35 is mounted upon the shaft 33 and meshes with a worm wheel 36 mounted upon the shaft 37 rotative within the casing. This shaft 37 is provided with a worm pinion 38 meshing with another worm wheel 39 fixed upon the shaft 32. The shaft 32 is rotatively supported within the casing and carries a large spur gear 40 and an adjacent small spur gear 41.

The tubular member 13 is arranged coaxially with the rotor 30 and enters the casing 31 and is provided with radial lugs 42 adapted to pass through openings 43 in a partition 44 fixed within the casing 31. This partition 44 is arranged immediately adjacent one end 31' of the casing so as to produce a small space between these parts into which the lugs 42 may engage. Springs 45 are mounted upon one side of the partition 44 and are adapted to coact with the lugs 42 for holding the tubular member in a fixed position.

A second partition 46 is mounted within the casing 31 slightly spaced from the partition 44 and forms a space with the partition 44 into which the lugs 42 of the tubular member may engage when these lugs are passed through the openings 43. Other springs 45' are mounted upon the other side of the partition 44 and are adapted to hold the lugs 42 in fixed position between the partitions 44 and 46.

The shaft 12 is rotatively but non-slidably mounted in bearings 47 in the tubular member 13. The inner end of the shaft 12 is provided with a small gear 48 and a large gear 49. The large gear 49 is adapted to mesh with the small gear 41 in one position of the tubular member 13, and the small gear 48 is adapted to mesh with the large gear 40 in a second position of the tubular member, these positions corresponding with the positions of the tubular member as allowed by the lugs 42.

In Fig. 5 the tubular member 13 is shown in its extended position in which the gears 49 and 41 mesh. This condition causes the shaft 12 to travel at a certain specific speed. This speed may be changed by first rotating the tubular member 13 slightly so that the lugs 42 align with the openings 43, then moving the tubular member 13 inwards, and then turning the tubular member to cause the lugs 42 to engage the springs 45' for maintaining the new positions of the tubular member. In this new position the small gear 48 will mesh with the large gear 40 and consequently the shaft 12 will now operate at a different speed.

In Fig. 9 a modified form of the invention has been illustrated in which a casing 14ª is mounted upon the end of the tubular member 13 and arranged to support a pair of brushes 15 in a line and adjacent each other. More particularly the casing 14ª is composed of two sections as previously described relative to the casing 14 and these sections are removably held together by screws 22. The sections of the casing 14ª serve to removably hold the bearing 26ª upon which the brushes 15 are removably mounted. Pins 28ª coact between the casing and the bearing 26ª for holding the bearing in position. Each of the spindles 25ª is provided with a bevel gear 27 meshing with a pair of bevel gears 24 fixed upon the shaft 12ª. The shaft 12ª is also provided with a pair of worm pinions 23ª for the purpose of meshing with worm wheels of other types of brushes as described relative to Fig. 3. The casing 14ª supports a removable guard 14ᵇ which extends over the backs of the brushes 15. In other respects this form of the invention is similar to that previously described.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An electric brush for teeth and the like, comprising a handle attached on a motor having a drive shaft extending through a tubular member attached on said motor, bearings with rotative brushes equipped with drive elements, a casing on the end of said tubular member and having an opening for supporting said bearings of rotative brushes equipped with drive elements one at a time, and a drive mechanism on said shaft adapted to coact with said drive elements, said drive mechanism including a spur gear and a worm pinion for selectively engaging with the drive element on one of said brushes depending upon the design of said drive element.

2. An electric brush for teeth and the like, comprising a handle attached on a motor including a motor casing and a motor rotor, reducing mechanism connected with said rotor, terminating in a shaft parallel but offset from the axis of said rotor and supporting a large and a small gear, a tubular member axial with said motor extending into said casing and having radial lugs, partitions in said casing certain of which being provided with openings for the passage of the lugs from the tubular member, means for holding said lugs between certain of said partitions for holding the tubular member extended or retracted, a shaft rotative and non-slidable through said tubular member and having a large gear for meshing with said small gear in one position of the tubular member and a small gear meshing with the large gear in another position of said tubular member, a casing on the end of said tubular member, a rotative brush supported by said casing, and a drive mechanism connecting said shaft and brush for rotating the brush.

3. An electric brush for teeth and the like, comprising a handle attached on a motor including a motor casing and a motor rotor, reducing mechanism connected with said rotor terminating in a shaft parallel but offset from the axis of said rotor and supporting a large and a small gear, a tubular member axial with said motor extending into said casing and having radial lugs, partitions in said casing certain of which being provided with openings for the passage of the lugs from the tubular member, means for holding the tubular member extended or retracted, a shaft rotative and non-slidable through said tubular member and having a large gear for meshing with said small gear in one position of the tubular member and a small gear meshing with the large gear in another position of said tubular member, a casing on the end of said tubular member, a rotative brush supported by said casing, and a drive mechanism connecting said shaft and brush for rotating the brush, said means for holding the lugs comprising springs attached upon certain of said partitions engageable with the lugs.

4. An electric brush for teeth and the like, comprising a handle attached on a motor having a drive shaft extending through a tubular member attached on said motor, bearings with rotative brushes equipped with drive elements, a casing on the end of said tubular member and having an opening for supporting said bearings of rotative brushes equipped with drive elements, and a drive mechanism on said shaft adapted to coact with said drive elements, said drive mechanism including a spur gear and a worm pinion for selectively engaging with the drive element on one of said brushes depending upon the design of said drive element.

5. An electric brush for teeth and the like, comprising a handle attached on a motor having a drive shaft extending through a tubular member attached on said motor, bearings with rotative brushes equipped with drive elements, a casing on the end of said tubular member and having an opening with means for supporting said bearings of rotative brushes equipped with drive elements, one at a time, and a drive mechanism on said shaft adapted to coact with said drive elements, said drive mechanism including a spur gear and a worm pinion for selectively engaging with the drive element on one of said brushes depending upon the design of said drive element.

VINCENT CONTI.